(12) United States Patent
Yoon et al.

(10) Patent No.: US 7,903,575 B2
(45) Date of Patent: Mar. 8, 2011

(54) BANDWIDTH-EFFICIENT CONTROL AND BITMAP SIGNALING USING SUPER POSITION CODING IN WIRELESS COMMUNICATION SYSTEMS

(75) Inventors: Young C. Yoon, San Diego, CA (US); Shu Wang, San Diego, CA (US)

(73) Assignee: LG Electronics, Inc., Seoul (KR)

( * ) Notice: Subject to any disclaimer, the term of this patent is extended or adjusted under 35 U.S.C. 154(b) by 875 days.

(21) Appl. No.: 11/833,089

(22) Filed: Aug. 2, 2007

(65) Prior Publication Data

US 2008/0089354 A1    Apr. 17, 2008

Related U.S. Application Data

(60) Provisional application No. 60/821,533, filed on Aug. 4, 2006, provisional application No. 60/822,225, filed on Aug. 11, 2006, provisional application No. 60/822,805, filed on Aug. 18, 2006.

(51) Int. Cl.
*H04W 72/04* (2009.01)
(52) U.S. Cl. ............... 370/252; 370/329; 370/395.2; 455/450; 455/509; 455/519
(58) Field of Classification Search .................. None
See application file for complete search history.

(56) References Cited

U.S. PATENT DOCUMENTS

| | | | |
|---|---|---|---|
| 6,452,915 B1 | 9/2002 | Jorgensen | 370/338 |
| 2004/0230675 A1* | 11/2004 | Freimuth et al. | 709/223 |
| 2006/0062171 A1* | 3/2006 | Baiamonte et al. | 370/328 |
| 2007/0121543 A1* | 5/2007 | Kuchibhotla et al. | 370/329 |
| 2008/0287138 A1* | 11/2008 | Yoon et al. | 455/452.2 |
| 2009/0067374 A1* | 3/2009 | Yoon et al. | 370/329 |

OTHER PUBLICATIONS

Al-Dhahir, N. et al: "Great Expectations: the Value of Spatial Diversity in Wireless Networks" In: Proceedings of the IEEE, Feb. 2, 2004.
* cited by examiner

*Primary Examiner* — Chi H. Pham
*Assistant Examiner* — Shick Hom
(74) *Attorney, Agent, or Firm* — Lee, Hong, Degerman, Kang & Waimey (57) ABSTRACT

The present invention is directed to defining forward link (FL) control signaling and bitmap signaling for indicating the channelization codes to be used by access terminals in a mobile communication system. In one aspect of the present invention, a method of allocating resources for a plurality of mobile communication terminals in a wireless communication system is provided. The method includes allocating at least one of the plurality of mobile communication terminals to a first group and at least one of the plurality of mobile communication terminals to a second group according to at least one of a location of and a QoS requirement of each of the plurality mobile communication terminals, generating resource allocation information for each of the first group and second group and transmitting the resource allocation information to each of the plurality of mobile communication terminals.

20 Claims, 7 Drawing Sheets

Group Resource Allocation Signaling

FIG. 1 UMB Centralized Access Network

FIG. 2 UMB Distributed Access Network

FIG. 3 UMB Layers

FIG. 4 Layered Modulation

FIG. 5 Signal multiplexing using no-orthogonal channelization codes

FIG. 6 Group Resource Allocation Signaling

FIG. 7a Two-layer bitmap design

FIG. 7b layered bitmaps, N = 2

FIG. 8 layered modulation or superposition coding

FIG. 9 link design –Transmit block diagram

FIG. 10

MOBILE STATION/ACCESS TERMINAL

US 7,903,575 B2

BANDWIDTH-EFFICIENT CONTROL AND BITMAP SIGNALING USING SUPER POSITION CODING IN WIRELESS COMMUNICATION SYSTEMS

CROSS-REFERENCE TO RELATED APPLICATIONS

Pursuant to 35 U.S.C. §120, this application claims the benefit of U.S. Provisional Application Ser. Nos. 60/821,533 filed on Aug. 4, 2006, 60/822,225, filed on Aug. 11, 2006 and 60/822,805, filed on Aug. 18, 2006, the contents of which are hereby incorporated by reference herein in their entirety.

FIELD OF THE INVENTION

The present invention is directed to defining forward link (FL) control signaling and bitmap signaling for indicating the channelization codes to be used by access terminals in a mobile communication system.

DESCRIPTION OF THE RELATED ART

Today, users of wireless communication enjoy freedom of mobility, whereby the user with a mobile terminal is able to travel from one place to another while talking to someone without losing connection. Often, a user moves from one service coverage area to another service coverage area, such as from one cell to another cell or, in other words, the user receives service in one coverage area serviced by one base station (BS) or an access network (AN) and then moves to a different coverage area serviced by another BS. This is necessary since a mobile terminal can be connected to only one BS at a time.

When moving from one service coverage area to another service coverage area, it is important to the user to be able to continue to receive service without interruption or losing connection. This is generally referred to as a handoff or handover. Furthermore, it is also very important for the user to continue to effectively receive service in the current service coverage area absent handover.

Therefore, signals from the BS must be transmitted to at least one receiving end, such as a mobile station or access terminal, more efficiently and more reliably. Ultra Mobile Broadband (UMB) combines the best aspects of CDMA, TDM, LS-OFDM, OFDM, and OFDMA into a single air interface using sophisticated control and signaling mechanisms and advanced antenna techniques in order to deliver ultra-high fixed and mobile broadband performance.

UMB supports a Forward link up to 280 Mbps and a Reverse link up to 68 Mbps while mobile and an average network latency of 16.8 msec. Furthermore, Voice over IP (VoIP) of up to 500 simultaneous users is facilitated while mobile. Moreover, UMB will enable the convergence of IP-based voice, broadband data, multimedia, information technology, entertainment and consumer electronic services.

UMB can efficiently support OFDMA MAC/Phy and fully support centralized as well as distributed access networks. Inter-access network interfaces are streamlined and fast layer 2 handoff is supported with seamless handoff across air interface revision boundaries.

Figure 1:
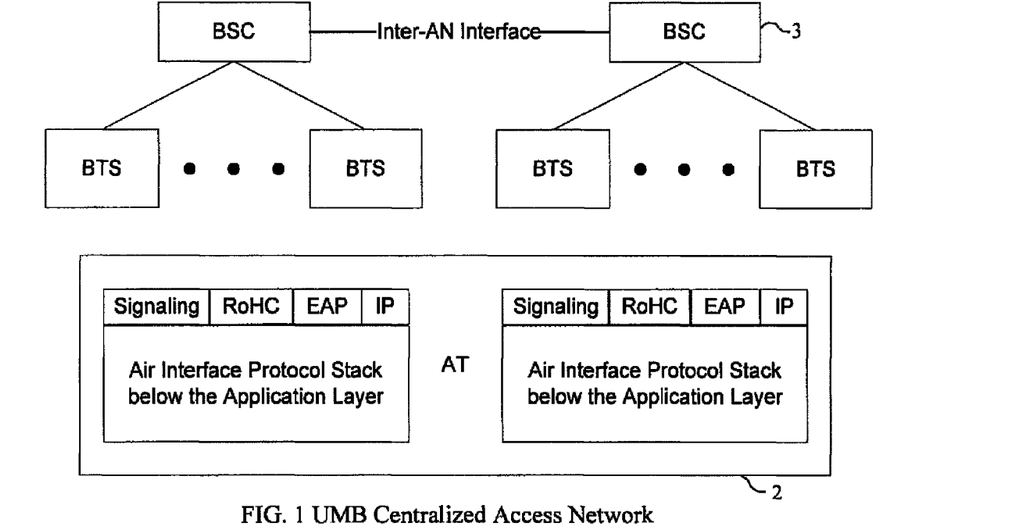
FIG. 1 illustrates a UMB centralized access network.

FIG. 1 illustrates a UMB centralized access network support. As illustrated in FIG. 1, each access terminal (AT) 2 maintains a separate protocol stack for each AN in the Active Set, with each protocol stack called a "Route." Furthermore each BSC 3 is a separate AN.

Figure 2:
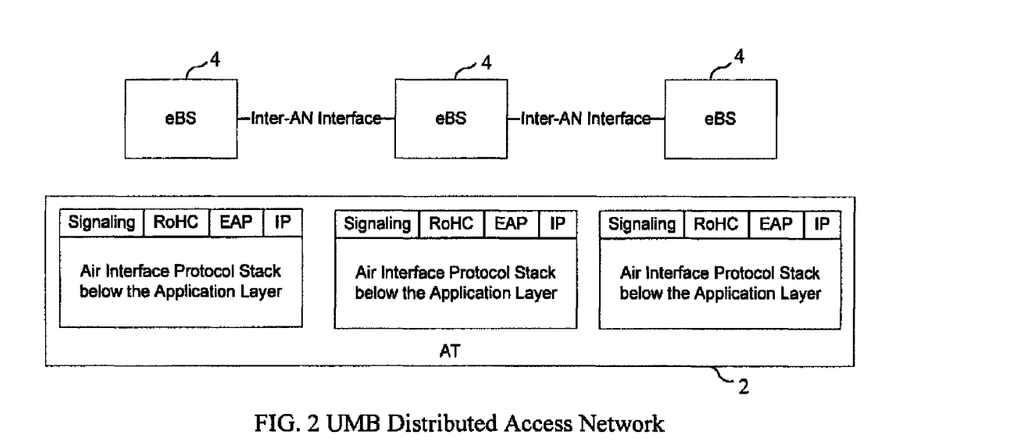
FIG. 2 illustrates a UMB distributed access network.

FIG. 2 illustrates UMB distributed access network. As illustrated in FIG. 2, each AT 2 maintains a separate protocol stack for each AN in the Active Set. Furthermore each cell is a separate AN.

UMB simplifies the inter-AN interface by requiring each AT 2 to support multiple Routes. A simpler inter-eBS interface leads to standardized, inter-operable implementations Each eBS 4 in the Active Set uses a separate data Route and there is no need to transfer RLP and header compression state between eBSs. Traffic flowing between an eBS 4 and an AT 2 can be tunneled through the serving eBS, thereby supporting fast and seamless re-pointing between cells.

Signaling messages of protocols between an eBS 4 and an AT 2 can be tunneled through the serving eBS. No eBS 4 has to maintain a connection state of other eBSs in the Active Set.

An UMB reverse link allows manycast. An AT 2 can send a packet once over the air and address it to multiple ANs.

Figure 3:
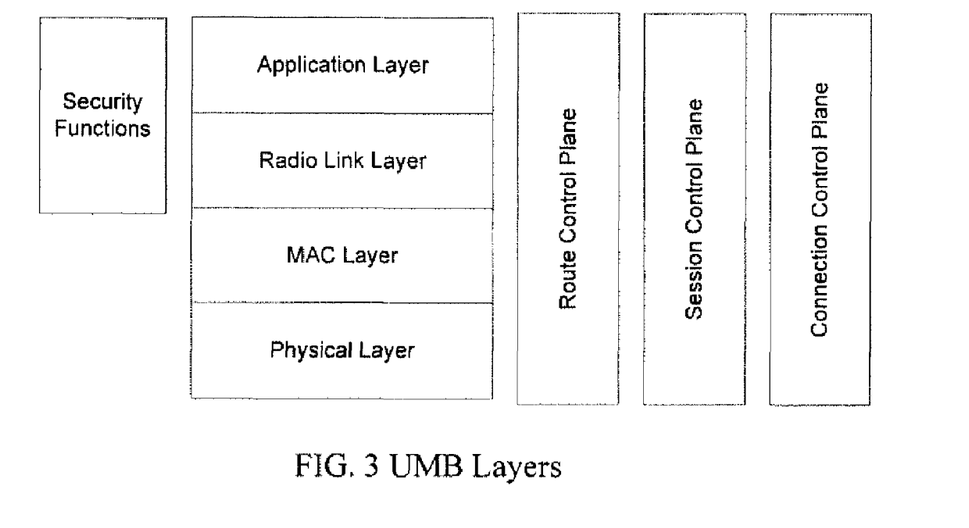
FIG. 3 illustrates UMB layers.

UMB layering reduces the number of protocols in the data path. FIG. 3 illustrates UMB layers.

The Application Layer provides a Signaling Application, IP, RoHC, EAP and inter-technology tunneling. The Radio Link Layer provides RLP and associated protocols. The MAC Layer provides Packet Consolidation Protocol and control of Physical Layer channels. The Physical Layer defines characteristics of air interface channels. The Security Functions are protocols for ciphering, message integrity, and key exchange. The Route Control Plane controls the creation and maintenance of air interface protocol stacks, one for each eBS 4. The Session Control Plane provides session negotiation. The Connection Control Plane controls the Connection between the AT 2 and an eBS 4.

In order to support VoIP, VoIP users are grouped and each is assigned a set of shared time-frequency resources. Bitmap signaling is used to allocate resources in each VoIP frame and control signaling is used for scheduling access terminals ATs 2 and indicating the transmission format as well as other information.

The transmission format refers to, for example, modulation order, data rate and coding rate. The control signal is referred to as a Shared Signaling Channel (SSCH), Shared Control Channel (SCCH) or Packet Data Control Channel (PDCH).

Bitmaps are broadcast, multicast type signals for scheduling multiple ATs 2, each having delay-sensitive low-rate traffic. Bitmap signaling is used for efficient scheduling of VoIP type traffic to ATs 2.

A bit position indicated as 'ON' or '1' indicates that the AT 2 indexed on that position, for example, bit position 4 for AT #10, is being scheduled for VoIP packet transmission. The bitmap must be transmitted at a power sufficiently high enough to reach all the ATs 2 in the bitmap or at least all the ATs that are allocated a channelization code. The bitmap can, therefore, be considered as a multicast/broadcast channel.

SUMMARY OF THE INVENTION

In one aspect of the present invention, a method of allocating resources for a plurality of mobile communication terminals in a wireless communication system is provided. The method includes allocating at least one of the plurality of mobile communication terminals to a first group and at least one of the plurality of mobile communication terminals to a second group according to at least one of a location of and a QoS requirement of each of the plurality mobile communication terminals, generating resource allocation information for each of the first group and second group and transmitting the resource allocation information to each of the plurality of mobile communication terminals.

It is contemplated that the allocation of at least one of the plurality of mobile communication terminals to the first group and at least one of the plurality of mobile communication terminals to the second group is further performed according to anticipated path loss when transmitting information to each of the plurality mobile communication terminals. It is further contemplated that the allocation of at least one of the plurality of mobile communication terminals to the first group and at least one of the plurality of mobile communication terminals to the second group is performed according to a geometry of each of the plurality mobile communication terminals.

It is contemplated that the allocation of at least one of the plurality of mobile communication terminals to the first group and at least one of the plurality of mobile communication terminals to the second group is performed according to information received from each of the plurality mobile communication terminals. It is further contemplated that the allocation of at least one of the plurality of mobile communication terminals to the first group and at least one of the plurality of mobile communication terminals to the second group further includes measuring the strength of a received signal.

It is contemplated that generating the resource allocation information includes generating a plurality of bit maps for the first group, a first of the plurality of bit maps identifying an allocation of resources to each of the plurality of mobile communication terminals in the first group and a second of the plurality of bit maps indicating the number of resources allocated for each mobile communication terminal identified in the first bit map as having resources allocated and generating a plurality of bit maps for the second group, a first of the plurality of bit maps identifying an allocation of resources to each of the plurality of mobile communication terminals in the second group and a second of the plurality of bit maps indicating the number of resources allocated for each mobile communication terminal identified in the first bit map as having resources allocated. It is further contemplated that the first of the plurality of bit maps for the first group identifies mobile communication terminals in the first group that are active and the first of the plurality of bit maps for the second group identifies mobile communication terminals in the second group that are active.

It is contemplated that the first of the plurality of bit maps for the first group identifies mobile communication terminals in the first group that are being served in a VoIP frame and the first of the plurality of bit maps for the second group identifies mobile communication terminals in the second group that are being served in a VoIP frame. It is further contemplated that the first of the plurality of bit maps for the first group identifies a specific portion of resources allocated to each of the plurality of mobile communication terminals in the first group and the first of the plurality of bit maps for the second group identifies a specific portion of resources allocated to each of the plurality of mobile communication terminals in the second group.

It is contemplated that the plurality of bitmaps for the first group are transmitted simultaneously with the plurality of bitmaps for the second group. It is further contemplated that transmitting the resource allocation information includes performing one of super-position coding, hierarchical modulation and layered modulation. Preferably, transmitting the resource allocation information includes performing multiple channelization coding over OFDM.

In another aspect of the present invention, a method of allocating resources for a plurality of mobile communication terminals in a wireless communication system is provided. The method includes receiving resource allocation information related to each of the plurality of mobile communication terminals, processing specific portions of the resource allocation information according to an allocation of at least one of the plurality of mobile communication terminals to a first group and at least one of the plurality of mobile communication terminals to a second group according to at least one of a location of and a QoS requirement of each of the plurality mobile communication terminals.

It is contemplated that processing specific portions of the resource allocation information includes receiving a plurality of bit maps for the first group, a first of the plurality of bit maps identifying an allocation of resources to each of the plurality of mobile communication terminals in the first group and a second of the plurality of bit maps indicating the number of resources allocated for each mobile communication terminal identified in the first bit map as having resources allocated and receiving a plurality of bit maps for the second group, a first of the plurality of bit maps identifying an allocation of resources to each of the plurality of mobile communication terminals in the first group and a second of the plurality of bit maps indicating the number of resources allocated for each mobile communication terminal identified in the first bit map as having resources allocated. It is further contemplated that processing specific portions of the resource allocation information includes determining whether a specific mobile terminal is allocated to the first group or the second group.

It is contemplated that the method further includes transmitting information corresponding to the geometry of a specific mobile terminal. It is further contemplated that the first of the plurality of bit maps for the first group identifies mobile communication terminals in the first group that are active and the first of the plurality of bit maps for the second group identifies mobile communication terminals in the second group that are active.

It is contemplated that the first of the plurality of bit maps for the first group identifies mobile communication terminals in the first group that are being served in a VoIP frame and the first of the plurality of bit maps for the second group identifies mobile communication terminals in the second group that are being served in a VoIP frame. It is further contemplated that the plurality of bitmaps for the first group are received simultaneously with the plurality of bitmaps for the second group.

It is contemplated that processing specific portions of the resource allocation information includes performing one of super-position decoding, hierarchical demodulation and layered demodulation. It is further contemplated that processing specific portions of the resource allocation information includes performing multiple channelization decoding over OFDM.

In another aspect of the present invention, a wireless communication system for allocating resources for a plurality of mobile communication terminals is provided The system includes a base station allocating at least one of the plurality of mobile communication terminals to a first group and at least one of the plurality of mobile communication terminals to a second group according to (a location of) (a reception ability of) (anticipated path loss when transmitting information to) (a required transmission power for transmitting information to) each of the plurality mobile communication terminals, the base station generating resource allocation information for each of the first group and second group and transmitting the resource allocation information to each of the plurality of mobile communication terminals and each of the plurality of mobile communication terminals processing specific portions of the resource allocation information according to the their allocation to one of the first group and the second group.

It is contemplated that the base station generates the resource allocation information by generating a plurality of bit maps for the first group, a first of the plurality of bit maps identifying mobile communication terminals allocated to the first group for which resources are allocated and a second of the plurality of bit maps indicating the number of resources allocated for each mobile communication terminal identified in the first bit map as having resources allocated and generating a plurality of bit maps for the second group, a first of the plurality of bit maps identifying mobile communication terminals allocated to the second group for which resources are allocated and a second of the plurality of bit maps indicating the number of resources allocated for each mobile communication terminal identified in the first bit map as having resources allocated. It is further contemplated that the base station transmits the plurality of bitmaps for the first group simultaneously with the plurality of bitmaps for the second group.

It is contemplated that the base station transmits the resource allocation information by performing one of super-position coding, hierarchical modulation and layered modulation. It is further contemplated that the base station transmits the resource allocation information by performing multiple channelization coding over OFDM.

In another aspect of the present invention, a mobile terminal for use in a wireless communication system where resources are allocated for a plurality of mobile communication terminals is provided. The mobile terminal includes a transmitting/receiving unit receiving resource allocation information related to each of the plurality of mobile communication terminals, a display unit displaying user interface information, an input unit receiving inputs from a user and a processing unit processing specific portions of the resource allocation information according to an allocation of at least one of the plurality of mobile communication terminals to a first group and at least one of the plurality of mobile communication terminals to a second group according to at least one of a location of and a QoS requirement of each of the plurality mobile communication terminals.

It is contemplated that the processing unit processes specific portions of the resource allocation information by receiving a plurality of bit maps for the first group, a first of the plurality of bit maps identifying an allocation of resources to each of the plurality of mobile communication terminals in the first group and a second of the plurality of bit maps indicating the number of resources allocated for each mobile communication terminal identified in the first bit map as having resources allocated and receiving a plurality of bit maps for the second group, a first of the plurality of bit maps identifying an allocation of resources to each of the plurality of mobile communication terminals in the first group and a second of the plurality of bit maps indicating the number of resources allocated for each mobile communication terminal identified in the first bit map as having resources allocated. It is further contemplated that the processing unit processes specific portions of the resource allocation information by determining whether a specific mobile terminal is allocated to the first group or the second group.

It is contemplated that the first of the plurality of bit maps for the first group identifies mobile communication terminals in the first group that are active and the first of the plurality of bit maps for the second group identifies mobile communication terminals in the second group that are active. It is further contemplated that the first of the plurality of bit maps for the first group identifies mobile communication terminals in the first group that are being served in a VoIP frame and the first of the plurality of bit maps for the second group identifies mobile communication terminals in the second group that are being served in a VoIP frame.

It is contemplated that the processing unit receives the plurality of bitmaps for the first group are received simultaneously with the plurality of bitmaps for the second group. It is further contemplated that the transmitting/receiving unit transmits information corresponding to the geometry of a specific mobile terminal.

It is contemplated that the processing unit processes specific portions of the resource allocation information by performing one of super-position decoding, hierarchical demodulation and layered demodulation. It is further contemplated that the processing unit processes specific portions of the resource allocation information by performing multiple channelization decoding over OFDM.

Additional features and advantages of the invention will be set forth in the description which follows, and in part will be apparent from the description, or may be learned by practice of the invention. It is to be understood that both the foregoing general description and the following detailed description of the present invention are exemplary and explanatory and are intended to provide further explanation of the invention as claimed.

These and other embodiments will also become readily apparent to those skilled in the art from the following detailed description of the embodiments having reference to the attached figures, the invention not being limited to any particular embodiments disclosed.

BRIEF DESCRIPTION OF THE DRAWINGS

The accompanying drawings, which are included to provide a further understanding of the invention and are incorporated in and constitute a part of this specification, illustrate embodiments of the invention and together with the description serve to explain the principles of the invention. Features, elements, and aspects of the invention that are referenced by the same numerals in different figures represent the same, equivalent, or similar features, elements, or aspects in accordance with one or more embodiments.

DETAILED DESCRIPTION OF THE PREFERRED EMBODIMENTS

Reference will now be made in detail to the preferred embodiments of the present invention, examples of which are illustrated in the accompanying drawings. Although the present invention is described with reference to VoIP traffic, it should be pointed out that the invention is also applicable to traffic types other than VoIP.

The invention addresses several problems in the prior art. Specifically, the invention is directed improving control signaling design to allow for more ATs 2 to be scheduled using same amount of bandwidth resources and improving the bitmap design to accommodate more ATs using the same BW resources for each bitmap.

In the prior art, a bitmap of length N supports a maximum of N VoIP ATs 2 with a control signal or a single bitmap of length N sent over a particular set of resources such as an orthogonal set of basis functions.

For example, the control information in the prior art may be sent over a subset of 16×8=128 OFDM tones for OFDM systems, sent on multiple Walsh or channelization codes for a CDMA system, or sent on multiple channelization codes over OFDM, such as MC-CDMA, DFT-OFDM, DFT-Spread-OFDM, SC-FDMA.

The present invention increases this maximum number beyond N significantly without increasing bandwidth resources. The increase in the maximum of ATs 2 supported is important when bandwidth resources are limited and when the given bandwidth resources for control signaling is limited and must be utilized as efficiently as possible in order to maximize the number of ATs that can be scheduled over the bitmap. The present invention is particularly useful since the bitmap signal needs to be transmitted at a high power, such as a broadcast channel, in order to reach all the ATs 2 scheduled in the bitmap.

One aspect of the present invention is specifically directed to control and bitmap transmission design. The present invention sends multiple layers of control or bitmap information over the same set of resources. The multiple control or bitmap layers can be sent using the same set of bandwidth resources.

One approach is to use super-position coding, hierarchical modulation or layered modulation. This allows the number of control or bitmap signals to be increased significantly without any increase in bandwidth resources, for example, by using the same number of tones or Walsh codes.

It is possible to use higher order modulation with or without channel coding. By using higher order modulation on the physical control channel, with or without channel coding, multiple layers of bits or more bits may be transmitted through a single physical modulated signal or channel.

Figure 4:
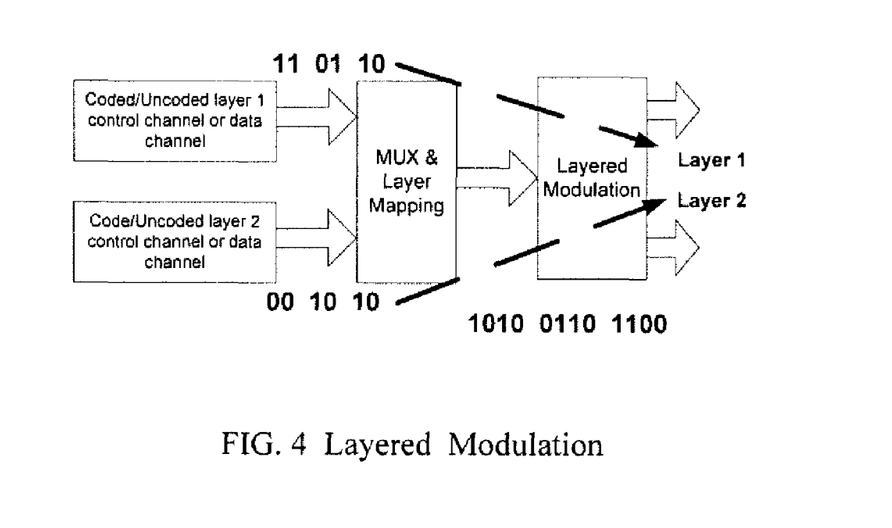
FIG. 4 illustrates layered modulation.

This approach may be considered a special case of layered modulation/superposition coding. FIG. 4 illustrates details of this approach as well as the traditional superposition approach.

Another possibility is to use quasi-orthogonal codes, such as Walsh codes and Quasi-orthogonal functions (QOF) used in cdma2000. This approach utilizes additional channelization codes that re-use the same bandwidth such that the bandwidth is not increased and non-orthogonal signals result.

Figure 5:
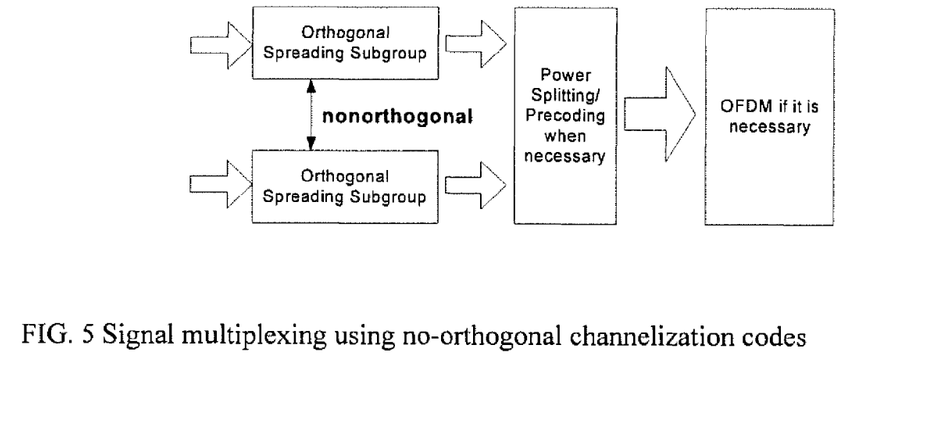
FIG. 5 illustrates signal multiplexing using no-orthogonal channelization codes.

FIG. 5 illustrates a case where the orthogonal spreading sequence sub-group contains a set of mutually orthogonal spreading sequences. However, non-orthogonality between sequences from different sets occurs when there are multiple sets.

For example, layer 1 can be the original control or bitmap sent at high power and layer 2 can be a new control or bitmap sent at a lower power in a two-layer case. Layer 1 can be used to schedule bad geometry ATs 2, such as those located at cell edges who require higher base station (BS) transmit power due to the greater path loss. Layer 2 can be used to schedule good geometry ATs 2, such as those located close to the BS. Each layer can be channel coded independently with its own CRC check sum.

With regard to the assignment of ATs 2, the two-layer case can be generalized for the M-layer case. Layer 2 control signals can be used to schedule an AT 2 on any traffic resource or on corresponding layer 2 traffic signals if layering is applied to the traffic channels as well.

An AT 2 can be assigned a bitmap position on each bitmap layer, on a subset of layers or on all the layers, thereby addressing all possible combinations. ATs 2 can be required to read the layers sequentially, such as from Layer 1 first for bad geometry ATs and Layer 2 and so on.

With regard to mapping bitmaps to traffic resources, an active bitmap position indicates that an AT 2 indexed on that position is active and being scheduled and that the AT indexed on that position uses a predefined channelization code or tone resource. Considering the number of earlier bitmap positions that are active can also indicate the channelization code index.

For example, indicating two of five earlier bitmap positions as active can be used to determine the channelization code index. In the case where the traffic resources also have multiple layers using, for example, super position coding or QoFs as mentioned above, then Layer 1 bitmap positions may map to resources in Layer 1 traffic resources. With the mapping continued for each bitmap layer in order to map to a corresponding traffic layer.

Active layer indication may be accomplished by adding a bit to a layer to indicate whether another layer exists. For example, an upper layer can be used to indicate the number of layers, with the indication done in a super-frame preamble at various periods, such as at the super frame period or some multiple of thereof.

A receiver can decode the control and/or bitmap transmissions using interference cancellation or joint detection. For example, an estimate of the layer 1 signal can be removed from the received signal before demodulating layer 2. This process can be iterated for layer 2, 3 and 4 such that previous or higher layers are always cancelled before decoding a particular layer. Joint detection refers to the receiver detecting the information bits from multiple layers or channelization codes at the same time.

The bitmap is jointly encoded in one packet for performance efficiency and sent over the span of the VoIP interlace unless it is more efficient for overall VoIP capacity to fit the bitmap in one F-SCCH message. The Bitmap_Channel field in the Group Setup message indicates the time frequency resource for the bitmap.

A first bitmap is used to indicate which ATs 2 are being served in each VoIP frame, where each AT 2 corresponds to a location in the bitmap. A second bitmap may be used to indicate a number of assigned resources and/or the packet format.

Each AT 2 determines its allocation based on the allocations for all ATs with a smaller bitmap position in the first bitmap. An example of group resource assignment is illustrated in FIG. 6.

Figure 6:
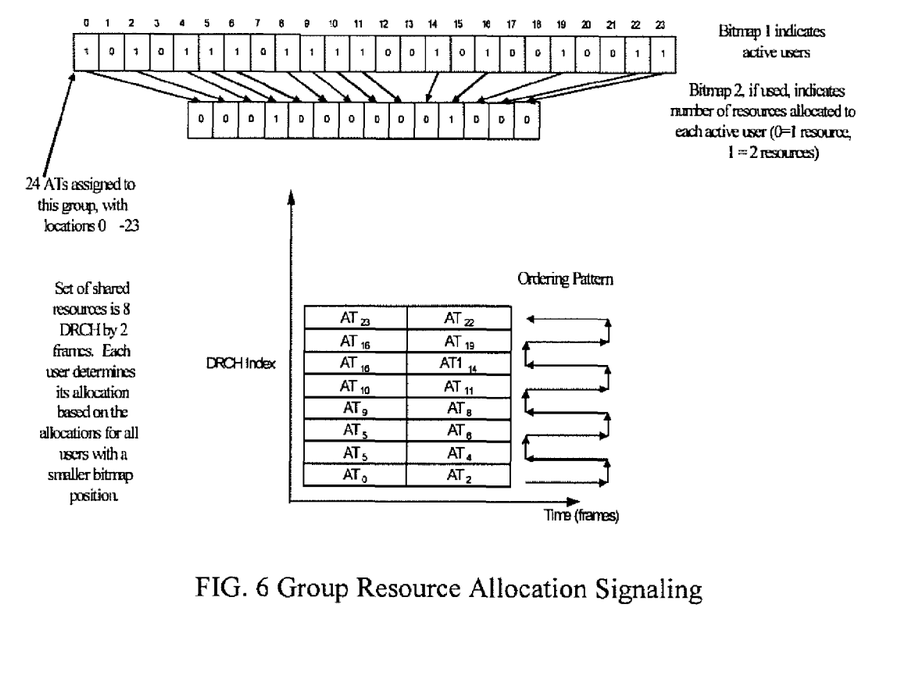
FIG. 6 illustrates group resource allocation signaling.

As illustrated in FIG. 6, twenty-four ATs 2 in a group are assigned to a set of shared resources in one VoIP frame consisting of 8 DRCH resources in each of the two adjacent frames. Each DRCH is 16 tones distributed in the frequency domain with each tone having 8 symbols.

The first bitmap is used to indicate active ATs 2. The bitmap locations correspond to AT 2 positions. For example, the AT 2 assigned the $0^{th}$ group position determines its assignment based on the $0^{th}$ position in the first bitmap.

Each AT 2 indicated by '1' in the first bitmap is active. The AT 2 with having the first indicated '1' is assigned the first 'M' blocks and the AT having the second indicated '1' is assigned the second N blocks, where 'M' and 'N' are the same if there is only the first bitmap and 'M' and 'N' may be different if there are two bitmaps.

The user with the first indicated '1' in the first bitmap corresponds to the first position in the second bitmap and the user with the second indicated '1' in the first bitmap corresponds to the second position in the second bitmap. As illustrative in FIG. 6, a '0' in the second bitmap corresponds to an assignment of one block and a '1' in the second bitmap corresponds to an assignment of two blocks.

The first active wireless terminal $AT_0$ is assigned one resource allocated block 0 since it is the first AT 2 allocated. The second active wireless terminal $AT_2$ is assigned one block and must sum the number of resources allocated to ATs 2 with a smaller position in the first bitmap. This process is repeated for all ATs 2.

As illustrated in FIG. 6, $AT_2$ must determine that one resource was previously assigned. Therefore, $AT_2$ is assigned block 1.

The third active wireless terminal $AT_4$ is assigned one block and must sum the number of resources allocated to ATs 2 with a smaller position in the first bitmap. As illustrated in FIG. 6, $AT_4$ must determine that two resources were previously assigned, specifically one resource for AT0 and one resource for AT2. Therefore, AT4 is assigned block 2.

Figure 7A:
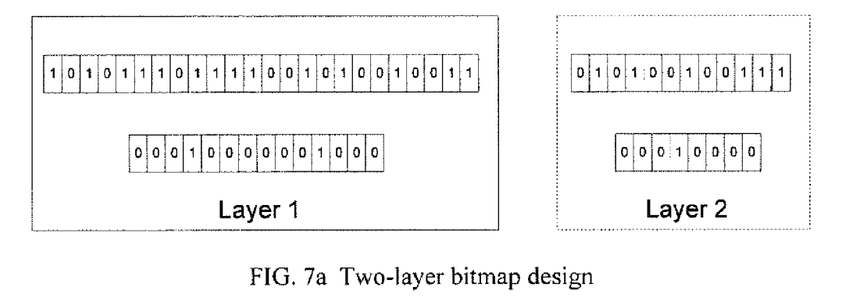
FIG. 7a illustrates two-layer bitmap design.
Figure 7B:
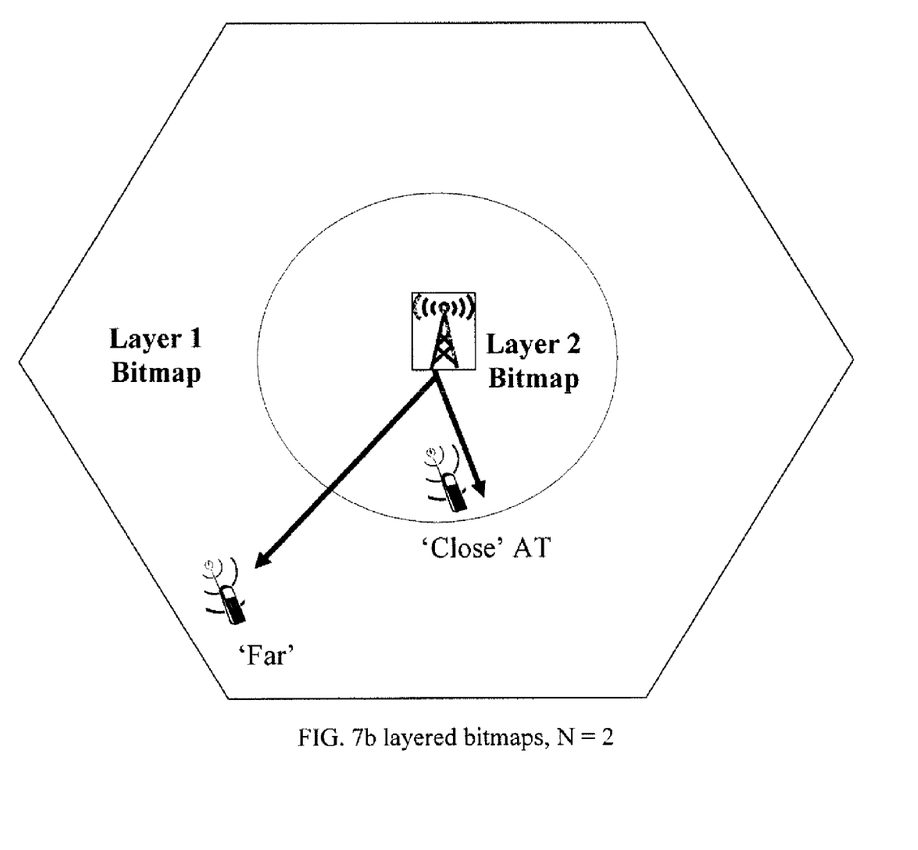
FIG. 7b illustrates two layered bitmaps.

FIGS. 7a and 7b illustrate an example for a new layered bitmap with two layers, with each layer consisting of two individual bitmaps. As illustrated in FIGS. 7a and 7b, the layer 1 bitmap is transmitted through the layer 1 signal of a control channel and is intended for both good geometry users and bad geometry users. The Layer 2 bitmap is transmitted through the Layer 2 signal of the control channel and is intended only for the good geometry users. Then same configuration may be used for the traffic channel.

FIGS. 7a and 7b illustrate the general case where the bitmap lengths are different. It is contemplated that the bitmaps may also be the same length.

Figure 8:
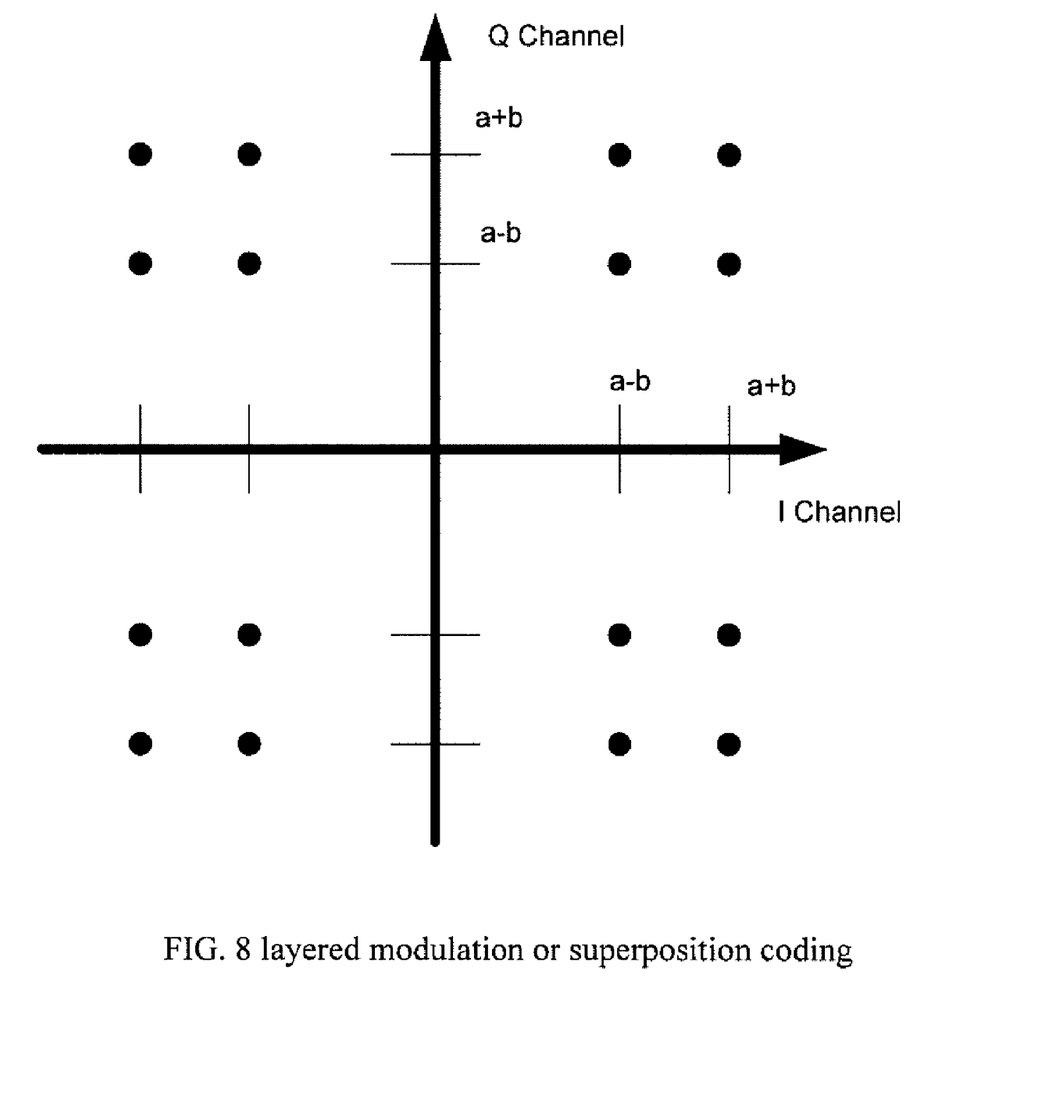
FIG. 8 illustrates layered modulation or superposition coding.

FIG. 8 illustrates an example of the signal constellation of layered modulated signals illustrated in FIGS. 7a and 7b. As illustrated in FIG. 8, 'a, b' is used to control the power distribution between layer 1 and layer 2, with 'a' indicating the portion of signal power of the layer 1 signal and 'b' indicating the portion of signal power for the layer 2 signal.

The present invention proposes to create 'N' multi-layered bitmaps using the same bandwidth resources required for a single bitmap. Layer 1 carries bitmap information sent with the highest power to reach the cell-edge. Layer 2 carries bitmap information sent with the second highest power. The invention is applicable to a general case of 'N' layers For example, if 'N=2', good geometry ATs 2, which are those close to the BTS, can be assigned to the layer 2 bitmap and bad geometry ATs, which are those toward the cell-edge, or good geometry ATs can be assigned to the layer 1 bitmap.

The bitmap of each layer can be independent. On the other hand, the bitmap of each layer can be concatenated to form a longer bitmap.

The present invention allows for greater multiplexing gains. The process fits nicely with layered bitmaps since the decoding of a particular layer requires the decoding of lower layers.

Figure 9:
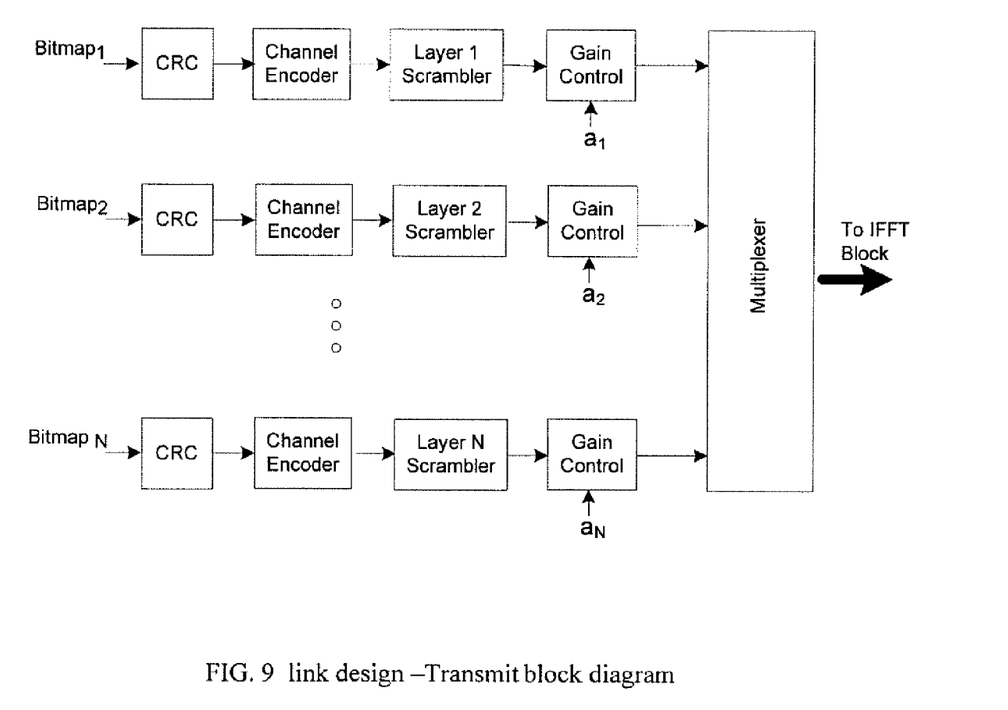
FIG. 9 illustrates a transmit block diagram.

A transmission block design similar to that of Layer 1 can be re-used for each subsequent layer. The transmission power of each layer is allocated a certain proportion of the total bitmap power. FIG. 9 illustrates such a transmission scheme.

For example, layer 'n' is assigned a proportion an where $n \in [1,N]$. The proportion of each layer, or $\alpha 1$ to $\alpha N$, is transmitted to the AT 2 either at call set up or as a broadcast message. A scrambler unique to each layer can be inserted.

Figure 10:
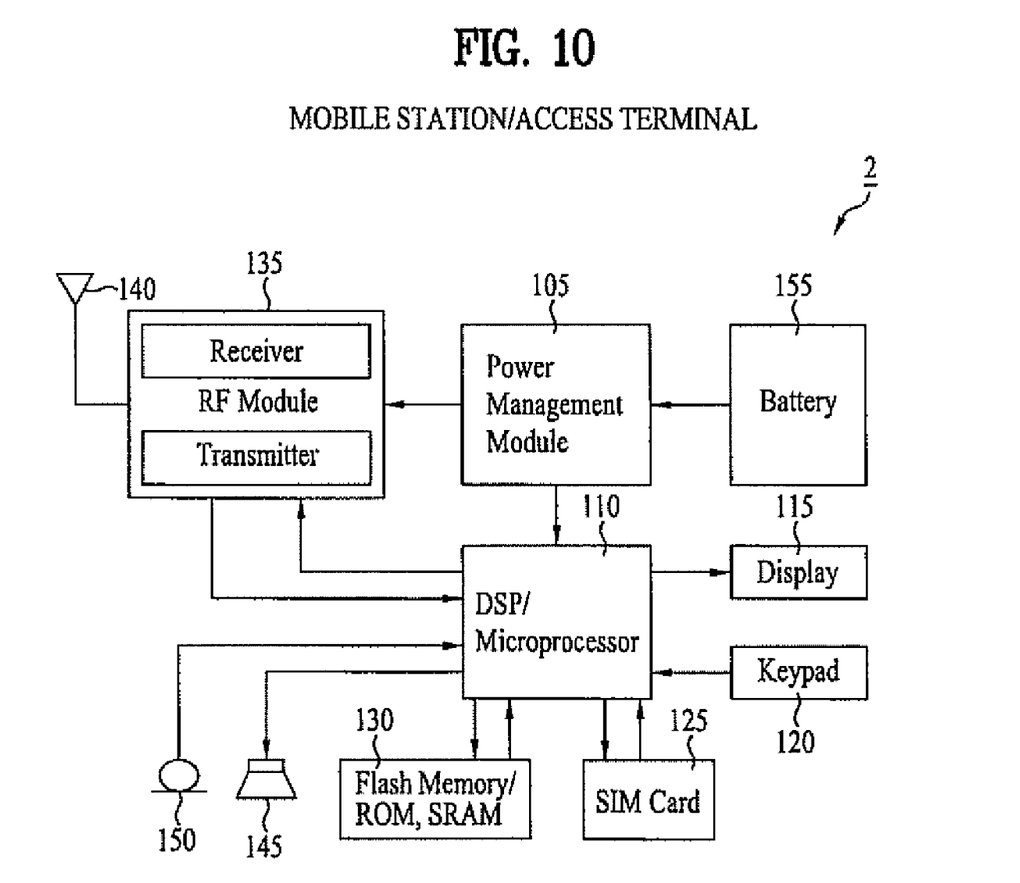
FIG. 10 illustrates a block diagram of a mobile station or access terminal.

FIG. 10 illustrates a block diagram of a mobile station (MS) or access terminal 2. The AT 2 includes a processor (or digital signal processor) 110, RF module 135, power management module 105, antenna 140, battery 155, display 115, keypad 120, memory 130, SIM card 125 (which may be optional), speaker 145 and microphone 150.

A user enters instructional information, such as a telephone number, for example, by pushing the buttons of a keypad 120 or by voice activation using the microphone 150. The microprocessor 110 receives and processes the instructional information to perform the appropriate function, such as to dial the telephone number. Operational data may be retrieved from the Subscriber Identity Module (SIM) card 125 or the memory module 130 to perform the function. Furthermore, the processor 110 may display the instructional and operational information on the display 115 for the user's reference and convenience.

The processor 110 issues instructional information to the RF module 135, to initiate communication, for example, transmits radio signals comprising voice communication data. The RF module 135 comprises a receiver and a transmitter to receive and transmit radio signals. An antenna 140 facilitates the transmission and reception of radio signals. Upon receiving radio signals, the RF module 135 may forward and convert the signals to baseband frequency for processing by the processor 110. The processed signals would be transformed into audible or readable information outputted via the speaker 145, for example. The processor 110 also includes the protocols and functions necessary to perform the various processes described herein with regard to UMB systems.

The present invention provides various advantages. First, bandwidth resources are saved since multiple bitmap groups can use the same bandwidth resources as that of one bitmap instead of multiple bandwidth resources of one bitmap. Second, either individual or concatenated bitmaps are supported.

As the present invention may be embodied in several forms without departing from the spirit or essential characteristics thereof, it should also be understood that the above-described embodiments are not limited by any of the details of the foregoing description, unless otherwise specified, but rather should be construed broadly within its spirit and scope as defined in the appended claims. Therefore, all changes and modifications that fall within the metes and bounds of the claims, or equivalence of such metes and bounds are intended to be embraced by the appended claims.

The foregoing embodiments and advantages are merely exemplary and are not to be construed as limiting the present invention. The present teaching can be readily applied to other types of apparatuses.

The description of the present invention is intended to be illustrative, and not to limit the scope of the claims. Many alternatives, modifications, and variations will be apparent to those skilled in the art. In the claims, means-plus-function clauses are intended to cover the structure described herein as performing the recited function and not only structural equivalents but also equivalent structures.

What is claimed is:

1. A method of allocating resources for a plurality of mobile communication terminals in a wireless communication system, the method comprising:

allocating at least one of the plurality of mobile communication terminals to a first group and at least one of the plurality of mobile communication terminals to a second group according to at least one of a location of and a QoS requirement of each of the plurality mobile communication terminals;

generating resource allocation information for each of the first group and second group; and transmitting the resource allocation information to each of the plurality of mobile communication terminals, wherein the allocation of at least one of the plurality of mobile communication terminals to the first group and at least one of the plurality of mobile communication terminals to the second group is further performed according to anticipated path loss when transmitting information to each of the plurality mobile communication terminals.

2. The method of claim 1, wherein the allocation of at least one of the plurality of mobile communication terminals to the first group and at least one of the plurality of mobile communication terminals to the second group is performed according to a geometry of each of the plurality mobile communication terminals.

3. The method of claim 2, wherein the allocation of at least one of the plurality of mobile communication terminals to the first group and at least one of the plurality of mobile communication terminals to the second group is performed according to information received from each of the plurality mobile communication terminals.

4. The method of claim 2, wherein the allocation of at least one of the plurality of mobile communication terminals to the first group and at least one of the plurality of mobile communication terminals to the second group further comprises measuring the strength of a received signal.

5. The method of claim 1, wherein generating the resource allocation information comprises:

generating a plurality of bit maps for the first group, a first of the plurality of bit maps identifying an allocation of resources to each of the plurality of mobile communication terminals in the first group and a second of the plurality of bit maps indicating the number of resources allocated for each mobile communication terminal identified in the first bit map as having resources allocated; and generating a plurality of bit maps for the second group, a first of the plurality of bit maps identifying an allocation of resources to each of the plurality of mobile communication terminals in the second group and a second of the plurality of bit maps indicating the number of resources allocated for each mobile communication terminal identified in the first bit map as having resources allocated.

6. The method of claim 5, wherein the first of the plurality of bit maps for the first group identifies mobile communication terminals in the first group that are active and the first of the plurality of bit maps for the second group identifies mobile communication terminals in the second group that are active.

7. The method of claim 5, wherein the first of the plurality of bit maps for the first group identifies mobile communication terminals in the first group that are being served in a VoIP frame and the first of the plurality of bit maps for the second group identifies mobile communication terminals in the second group that are being served in a VoIP frame.

8. The method of claim 5, wherein the first of the plurality of bit maps for the first group identifies a specific portion of resources allocated to each of the plurality of mobile communication terminals in the first group and the first of the plurality of bit maps for the second group identifies a specific portion of resources allocated to each of the plurality of mobile communication terminals in the second group.

9. The method of claim 5, wherein the plurality of bitmaps for the first group are transmitted simultaneously with the plurality of bitmaps for the second group.

10. The method of claim 1, wherein transmitting the resource allocation information comprises performing one of super-position coding, hierarchical modulation and layered modulation.

11. The method of claim 1, wherein transmitting the resource allocation information comprises performing multiple channelization coding over OFDM.

12. A mobile terminal for use in a wireless communication system where resources are allocated for a plurality of mobile communication terminals, the mobile terminal comprising:

a transceiver unit receiving resource allocation information related to each of the plurality of mobile communication terminals;

a display unit displaying user interface information;

an input unit receiving inputs from a user; and a processing unit processing specific portions of the resource allocation information according to an allocation of at least one of the plurality of mobile communication terminals to a first group and at least one of the plurality of mobile communication terminals to a second group according to at least one of a location of and a QoS requirement of each of the plurality mobile communication terminals, wherein the allocation of at least one of the plurality of mobile communication terminals to the first group and at least one of the plurality of mobile communication terminals to the second group is further performed according to anticipated path loss when transmitting information to each of the plurality mobile communication terminals.

13. The mobile terminal of claim 12, wherein the processing unit processes specific portions of the resource allocation information by:

receiving a plurality of bit maps for the first group, a first of the plurality of bit maps identifying an allocation of resources to each of the plurality of mobile communication terminals in the first group and a second of the plurality of bit maps indicating the number of resources allocated for each mobile communication terminal identified in the first bit map as having resources allocated; and receiving a plurality of bit maps for the second group, a first of the plurality of bit maps identifying an allocation of resources to each of the plurality of mobile communication terminals in the second group and a second of the plurality of bit maps indicating the number of resources allocated for each mobile communication terminal identified in the first bit map as having resources allocated.

14. The mobile terminal of claim 13, wherein the processing unit processes specific portions of the resource allocation information by determining whether a specific mobile terminal is allocated to the first group or the second group.

15. The mobile terminal of claim 13, wherein the first of the plurality of bit maps for the first group identifies mobile communication terminals in the first group that are active and the first of the plurality of bit maps for the second group identifies mobile communication terminals in the second group that are active.

16. The mobile terminal of claim 13, wherein the first of the plurality of bit maps for the first group identifies mobile communication terminals in the first group that are being served in a VoIP frame and the first of the plurality of bit maps for the second group identifies mobile communication terminals in the second group that are being served in a VoIP frame.

17. The mobile terminal of claim 13, wherein the processing unit receives the plurality of bitmaps for the first group simultaneously with the plurality of bitmaps for the second group.

18. The mobile terminal of claim 12, wherein the transceiver unit transmits information corresponding to the geometry of a specific mobile terminal.

19. The mobile terminal of claim 12, wherein the processing unit processes specific portions of the resource allocation information by performing one of super-position decoding, hierarchical demodulation and layered demodulation.

20. The mobile terminal of claim 12, wherein the processing unit processes specific portions of the resource allocation information by performing multiple channelization decoding over OFDM.

* * * * *